(12) United States Patent
Tezuka et al.

(10) Patent No.: US 10,836,305 B2
(45) Date of Patent: Nov. 17, 2020

(54) MARKER LAMP SYSTEM

(71) Applicant: Koito Manufacturing Co., Ltd., Tokyo (JP)

(72) Inventors: Nobutaka Tezuka, Shizuoka (JP); Yuichi Watano, Shizuoka (JP); Shigeyuki Watanabe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/720,105

(22) Filed: Dec. 19, 2019

(65) Prior Publication Data
US 2020/0207258 A1 Jul. 2, 2020

(30) Foreign Application Priority Data

Dec. 28, 2018 (JP) ................. 2018-247867

(51) Int. Cl.
*B60Q 1/32* (2006.01)
*F21S 43/14* (2018.01)
*F21Y 115/10* (2016.01)
*G06K 9/00* (2006.01)
*B60R 11/04* (2006.01)
*F21W 103/20* (2018.01)

(52) U.S. Cl.
CPC ............ *B60Q 1/32* (2013.01); *F21S 43/14* (2018.01); *B60Q 2400/40* (2013.01); *B60Q 2400/50* (2013.01); *B60R 11/04* (2013.01); *F21W 2103/20* (2018.01); *F21Y 2115/10* (2016.08); *G06K 9/00369* (2013.01)

(58) Field of Classification Search
CPC . B60Q 1/26; B60Q 1/32; B60Q 1/323; B60Q 2400/40; B60Q 2400/50; F21S 43/00; F21S 43/10; F21S 43/13; F21S 43/14; F21W 2103/00; F21W 2103/10; F21W 2103/15; F21W 2103/20; B60R 11/04; G06K 9/00362; G06K 9/00369
See application file for complete search history.

(56) References Cited

U.S. PATENT DOCUMENTS

| | | | | |
|---|---|---|---|---|
| 8,890,713 B2 * | 11/2014 | Breuer | .................... | B60T 8/172 340/905 |
| 9,321,395 B2 * | 4/2016 | Ammar | ................ | B60Q 1/0023 |
| 9,340,155 B2 * | 5/2016 | Pisz | .......................... | B60R 1/00 |
| 10,134,280 B1 * | 11/2018 | You | .......................... | B60Q 1/34 |
| 10,223,915 B2 * | 3/2019 | Haines | .................. | G08G 1/161 |
| 2005/0117364 A1 * | 6/2005 | Rennick | .............. | B60Q 1/2665 362/540 |
| 2007/0053195 A1 * | 3/2007 | Alberti | ................ | B60Q 1/2665 362/494 |
| 2010/0302794 A1 * | 12/2010 | Oomen | ................ | F21V 7/0025 362/519 |

(Continued)

FOREIGN PATENT DOCUMENTS

WO 2017/073634 A 5/2017

*Primary Examiner* — Jason Crawford
(74) *Attorney, Agent, or Firm* — Abelman, Frayne & Schwab

(57) ABSTRACT

A marker lamp system includes a sensor configured to detect information around a vehicle, a projector configured to project an image onto a road surface around the vehicle, a controller configured to control the projector based on a detecting result of the sensor, and a marker lamp having a light emitting area surrounding the sensor and the projector.

10 Claims, 7 Drawing Sheets

(56) References Cited

U.S. PATENT DOCUMENTS

| | | | |
|---|---|---|---|
| 2010/0321945 A1* | 12/2010 | Lang | E05B 17/10 |
| | | | 362/501 |
| 2015/0298598 A1* | 10/2015 | Nussli | B60Q 1/2665 |
| | | | 345/2.2 |
| 2016/0207443 A1* | 7/2016 | Widdowson | B60Q 1/0011 |
| 2017/0182934 A1* | 6/2017 | Arita | G06T 7/70 |
| 2017/0210282 A1* | 7/2017 | Rodriguez Barros | B60Q 1/484 |
| 2019/0005727 A1* | 1/2019 | Tanaka | G06T 19/006 |
| 2019/0016257 A1* | 1/2019 | Sakata | B60Q 1/50 |
| 2019/0104285 A1* | 4/2019 | Medvec | H04N 9/3141 |
| 2019/0126824 A1* | 5/2019 | Oba | G02B 27/0101 |
| 2019/0236939 A1* | 8/2019 | Zhang | G08G 1/095 |
| 2019/0366916 A1* | 12/2019 | Singh | B60Q 1/44 |

* cited by examiner

TRAVELING DIRECTION

MARKER LAMP SYSTEM

CROSS-REFERENCE TO RELATED APPLICATIONS

This application is based on and claims priority from Japanese Patent Application No. 2018-247867, filed on Dec. 28, 2018, with the Japan Patent Office, the disclosure of which is incorporated herein in its entirety by reference.

TECHNICAL FIELD

The present disclosure relates to a marker lamp system mounted on an automatic driving vehicle.

BACKGROUND

A research on an automatic driving technology of a vehicle is actively being conducted in many countries, and legislation to enable vehicles to travel on public roads in an automatic driving mode (e.g., a self-driving mode) is being studied in various countries. Levels 0 to 5 are defined for the automatic driving, and generally, level 3 or higher is defined as the automatic driving. Level 3 is referred to as a conditional automatic driving, in which an automatic system operates everything at a specific location, and a driver operates in an emergency. Level 4 is referred to as a highly automatic driving, in which the automatic system recognizes traffic conditions only in a specific location such as an expressway and performs all operations related to driving in the specific location. Level 5 is referred to as a fully automatic driving, in which the automatic system recognizes traffic conditions and performs all operations related to driving without being limited by the locations. See, for example, International Publication Pamphlet No. WO 2017/073634.

SUMMARY

It is necessary to provide a lamp (referred to as an "automatic driving marker lamp") to an automatic driving vehicle in order to inform that the own vehicle is being driven automatically to the surroundings, and currently, standards are being developed. Under such circumstances, the present inventor has invented a marker lamp system not only capable of indicating during automatic driving, but also communicating with an occupant or a person around the vehicle.

The present disclosure has been made in consideration of such circumstances, and is to provide a marker lamp system capable of indicating during automatic driving, and communicating with an occupant or a person around the vehicle.

In order to solve the above problem, a marker lamp system according to an aspect of the present disclosure includes a sensor device configured to detect information around a vehicle, a road surface drawing and projecting device configured to project an image onto the road surface around the vehicle, a controller which controls the road surface drawing and projecting device based on a detecting result of the sensor device, and an automatic driving marker lamp having a light emitting area surrounding the sensor device and the road surface drawing and projecting device.

The sensor device may include a camera. The controller may perform image recognition of a person around the vehicle from an image captured by the camera, and control the road surface drawing and projecting device based on a result of the image recognition.

The controller may partly turn on/off the light emitting area of the automatic driving marker lamp based on driving information of the vehicle received from outside.

According to the present disclosure, a marker lamp system capable of indicating during automatic driving, and communicating with an occupant or a person around the vehicle may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
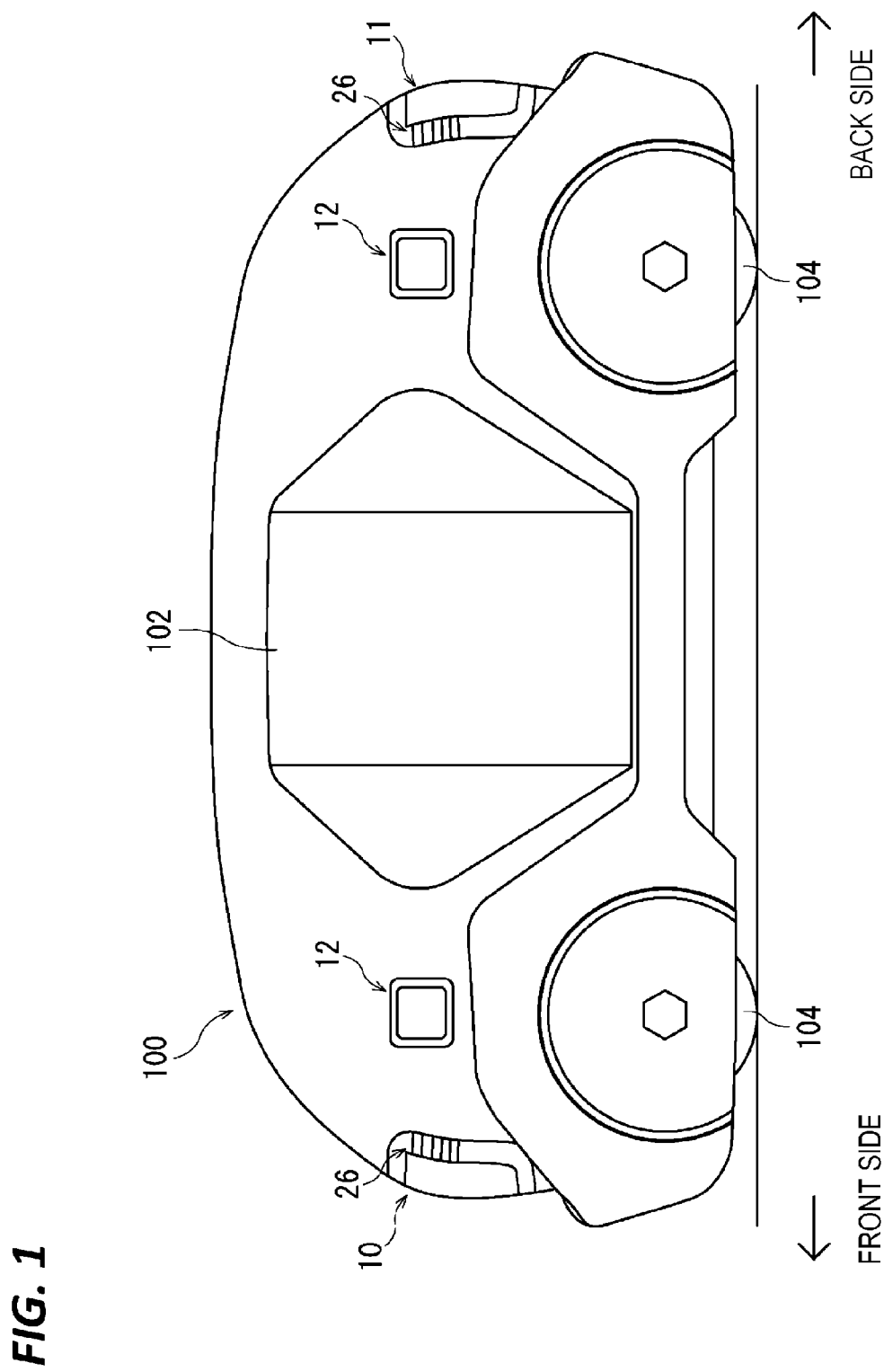
FIG. 1 is a side view of a vehicle on which a marker lamp system according to an embodiment of the present disclosure is mounted.

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a marker lamp system according to an embodiment of the present disclosure will be described in detail with reference to the drawings. Since each of the drawings is provided to explain a positional relationship of each member, it is not necessary to represent an actual dimensional relationship of each member. Further, in the description of each embodiment, the same or corresponding elements are denoted by the same reference numerals and redundant explanation will be properly omitted.

FIG. 1 is a side view of a vehicle 100 on which a marker lamp system 12 according to an embodiment of the present disclosure is mounted.

The vehicle 100, which corresponds to a fully automatic driving at level 5, does not include a driver's seat. The vehicle 100 is substantially symmetrical in a vehicle length (a direction perpendicular to the vehicle width, which will be hereinafter referred to as a "vehicle length direction") and is movable in both of the vehicle length directions. For convenience, one side (left side in FIG. 1) of the vehicle length direction is regarded as a front side, and the other side (right side in FIG. 1) of the vehicle length direction is regarded as a back side. The vehicle 100 includes a getting-on/off unit 102 through which an occupant gets on/off, tires 104, and the like.

As illustrated in FIG. 1, a vehicle lamp 10 is disposed on the front side of the vehicle 100, and a vehicle lamp 11 is disposed on the back side thereof. The vehicle lamps 10 and 11 respectively include an irradiation light color variable lamp unit 26 capable of irradiating white light to be irradiated in the vehicle traveling direction and red light to be irradiated in the direction opposite to the vehicle traveling direction. The white light to be irradiated in the vehicle traveling direction is light having a color and intensity which satisfy the regulations required for a normal head lamp. Further, the red light to be irradiated in the direction opposite to the vehicle traveling direction is light having a color and intensity which satisfy the regulations required for a normal rear lamp. The irradiated light color variable lamp unit 26 may irradiate both the white light and the red right according to the vehicle traveling direction to the front side of the lamp. Therefore, the irradiated light color variable lamp unit 26 is suitable for a fully automatic driving vehicle which changes the travel direction thereof according to the surrounding circumstances.

The marker lamp system 12 according to the present disclosure is disposed on the side surface of the vehicle 100. The marker lamp system 12 is disposed at four locations on the front side and the back side on both sides of the vehicle 100.

Figure 2:
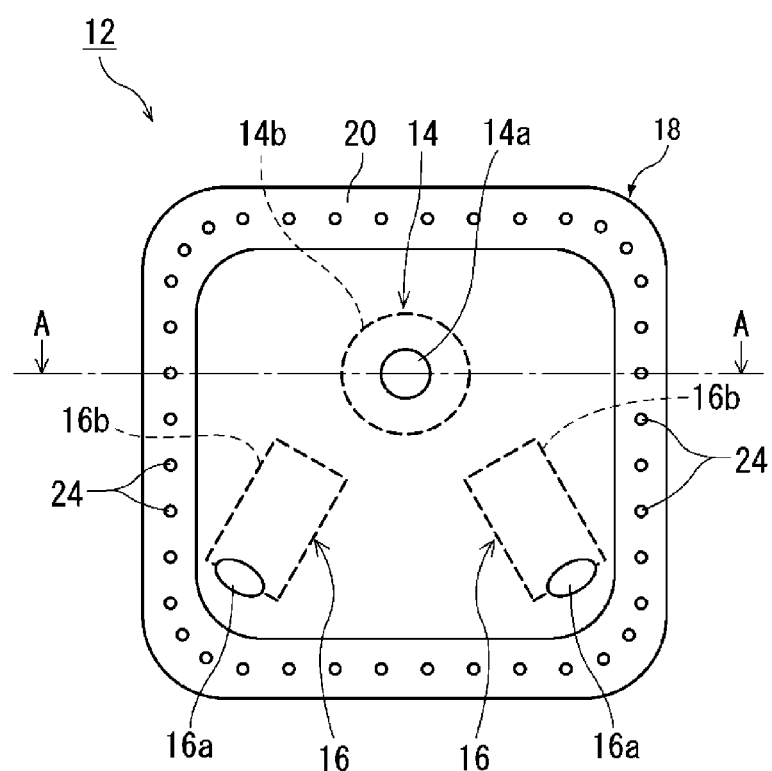
FIG. 2 is a schematic front view of the marker lamp system.
Figure 3:
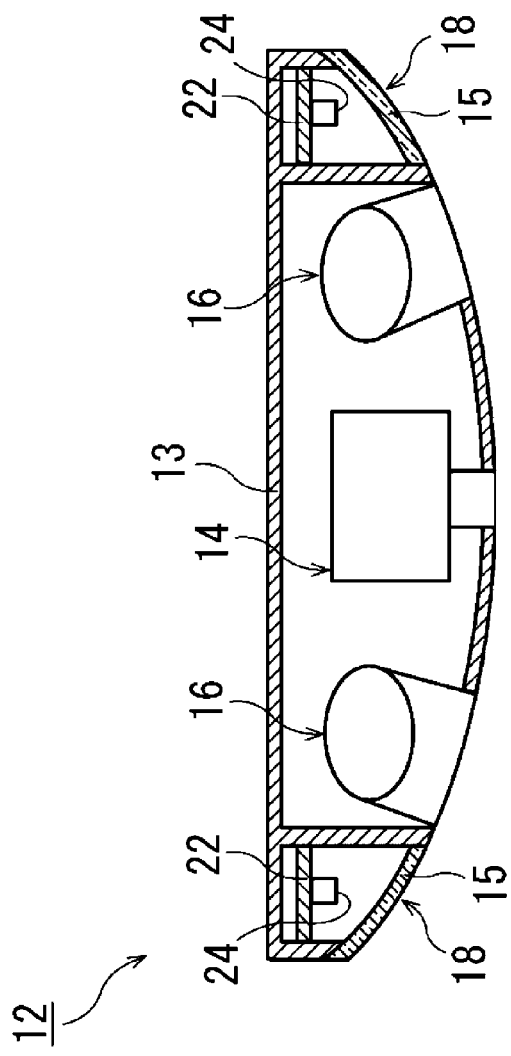
FIG. 3 is a schematic cross-sectional view taken along line A-A of the marker lamp system illustrated in FIG. 2.

FIG. 2 is a schematic front view of the marker lamp system 12. FIG. 3 is a schematic cross-sectional view taken along line A-A of the marker lamp system 12 illustrated in FIG. 2. The marker lamp system 12 may be disposed to be always exposed on the side surface of the vehicle 100, or may be disposed to be accommodated on the side surface of the vehicle 100.

The marker lamp system 12 includes a lamp body 13 having a rectangular shape (square shape) when viewed from the front. A camera 14 is accommodated in a substantially central portion in the lamp body 13, and a road surface drawing and projecting device 16 is accommodated in a lower left portion and a lower right portion, respectively.

An automatic driving marker lamp 18 is disposed on an outer peripheral portion of the lamp body 13. The automatic driving marker lamp 18 is also called as an automated driving (AD) marker lamp, and is a lamp configured to inform that the vehicle is being driven automatically to the surroundings. The automatic driving marker lamp 18 includes a light emitting area 20 surrounding the camera 14 and the road surface drawing and projecting device 16. The light emitting area 20 has a rectangular shape (square shape) when viewed from the front, and emits light in a turquoise color. The expression "the camera 14 and the road surface drawing and projecting device 16 are surrounded by the light emitting area 20" refers to a state where at least a lens 14a of the camera 14 and a lens 16a of the road surface drawing and projecting device 16 are surrounded by the light emitting area 20 when viewed from the front, and it is not necessary for the entirety of the camera 14 and the road surface drawing and projecting device 16 to be surrounded by the light emitting area 20. For example, a body 14b of the camera 14 or a body 16b of the road surface drawing and projecting device 16 may be positioned outside the light emitting area 20.

The automatic driving marker lamp 18 includes a substrate 22, a plurality of LEDs 24 which are disposed on the substrate 22 and emit light in the turquoise color, and a transparent outer lens 15 disposed in front of the LEDs 24. Alternately, the turquoise color may be implemented by using an LED which emits white light and a turquoise-color outer lens. As illustrated in FIG. 2, the plurality of LEDs 24 are arranged in a substantially rectangular shape along the outer periphery of the marker lamp system 12, and the outer lens 15 is formed in a substantially rectangular shape when viewed from the front so as to cover the front side of the plurality of LEDs 24. The outer lens 15 is formed to be curved over the end to be able to irradiate light in the front direction and the back direction of the vehicle 100.

Figure 4:
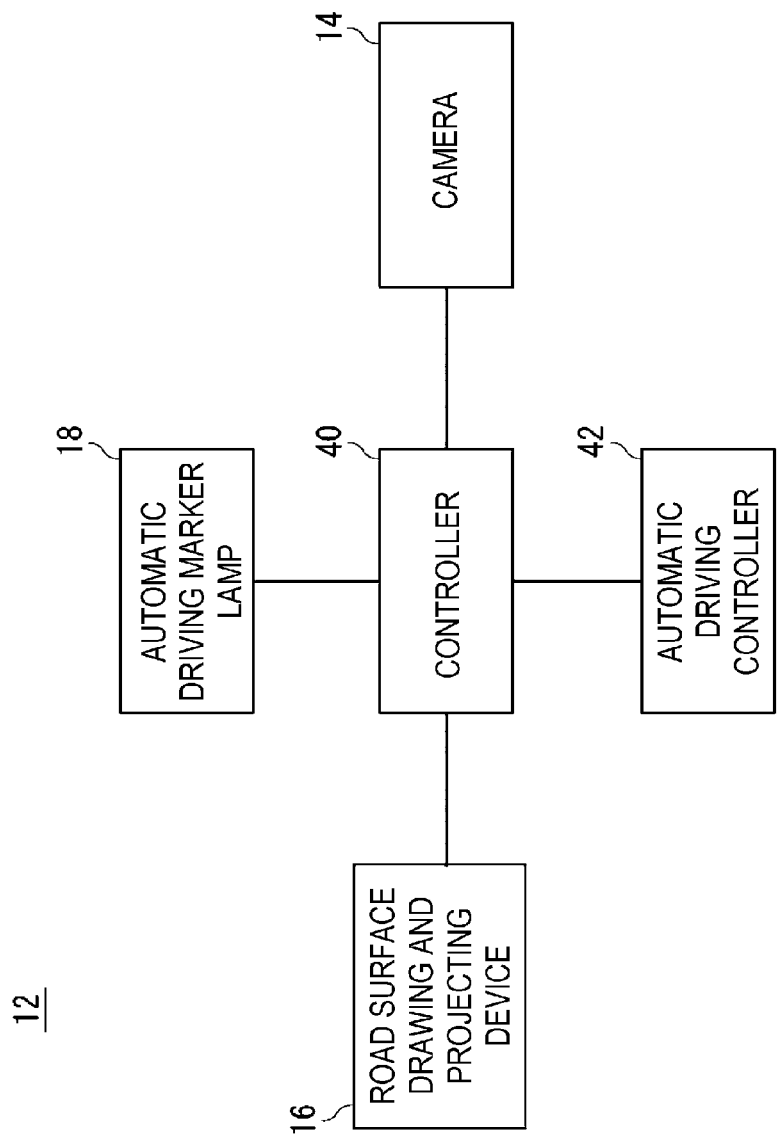
FIG. 4 is a functional block diagram for explaining the marker lamp system according to the embodiment of the present disclosure.

FIG. 4 is a functional block diagram for explaining the marker lamp system 12 according to the embodiment of the present disclosure. As illustrated in FIG. 4, the marker lamp system 12 includes the camera 14 as a sensor device which detects information around the vehicle, the road surface drawing and projecting device 16 which projects an image onto the road surface around the vehicle, the controller 40, and the automatic driving marker lamp 18. The controller 40 may be disposed inside the lamp body 13 of the marker lamp system 12, or may be disposed outside the lamp body 13.

Figure 5:
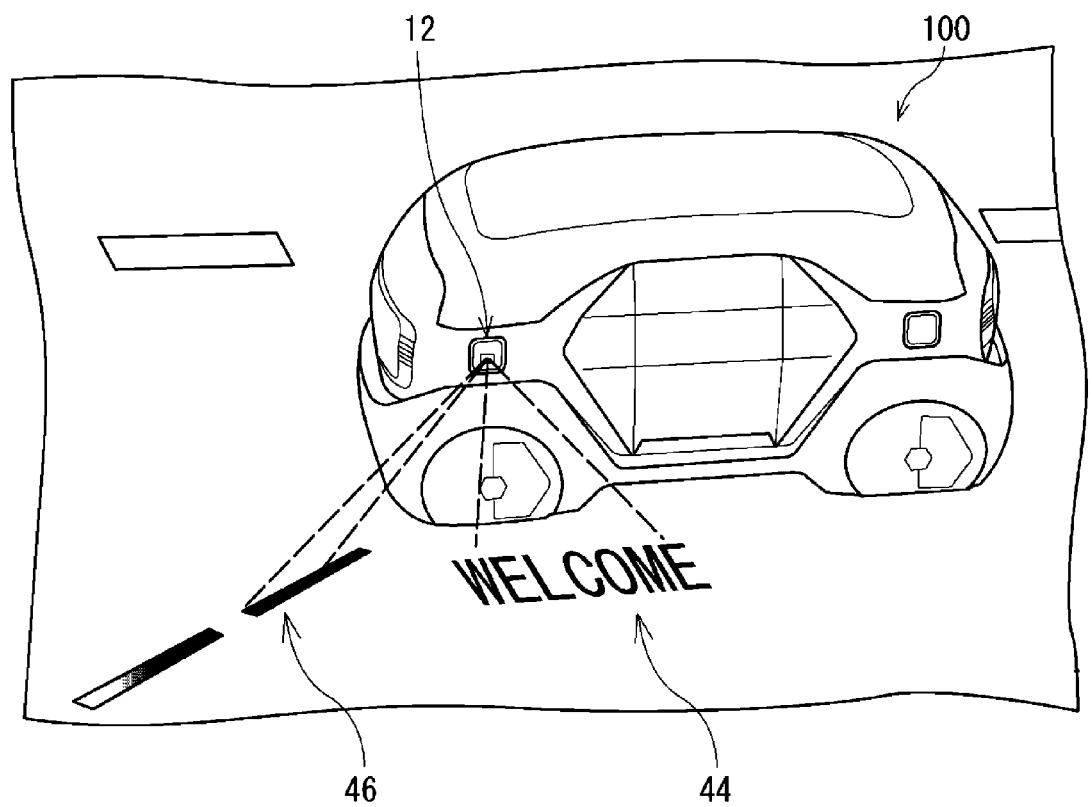
FIG. 5 is a view illustrating an example of a road surface drawing by a road surface drawing and projecting device.

The camera 14 captures the surroundings of the vehicle, and sends the captured image to the controller 40. The controller 40 performs image recognition of a person around the vehicle from the image captured by the camera 14, and controls the road surface drawing and projecting device 16 based on a result of the image recognition. FIG. 5 illustrates an example of a road surface drawing by the road surface drawing and projecting device 16. When an occupant around the vehicle is detected as the result of the image recognition, for example, as illustrated in FIG. 5, the road surface drawing and projecting device 16 draws a message 44 which welcomes the occupant such as "WELCOME" on the road surface. According to the marker lamp system 12 according to the embodiment, it is possible to communicate with the occupant in this manner.

As illustrated in FIG. 4, the controller 40 may be connected to an automatic driving controller 42 included in the vehicle 100. The controller 40 acquires information on whether or not the vehicle 100 is being driven automatically from the automatic driving controller 42, and turns on the automatic driving marker lamp 18 if the vehicle 100 is being driven automatically.

The controller 40 may acquire turning ON/OFF information of the turn signal lamp from the automatic driving controller 42. When turning ON information of the turn signal lamp is acquired, for example, as illustrated in FIG. 5, an indicator 46 is drawn on the road surface. Therefore, the traveling direction of the vehicle may be clearly shown to pedestrians or the like, and thus, safety may be improved. According to the marker lamp system 12 according to the embodiment, it is possible to communicate with the pedestrians around the vehicle in this manner.

As described above, the automatic driving marker lamp 18 includes the plurality of LEDs 24 arranged in a substantially rectangular shape along the outer periphery of the marker lamp system 12. In the embodiment, the controller 40 is configured to be capable of controlling the light emitting/non-light emitting of the individual LED 24, and thus, the light emitting area 20 having the rectangular shape may be partly turned on/off.

Figure 6:
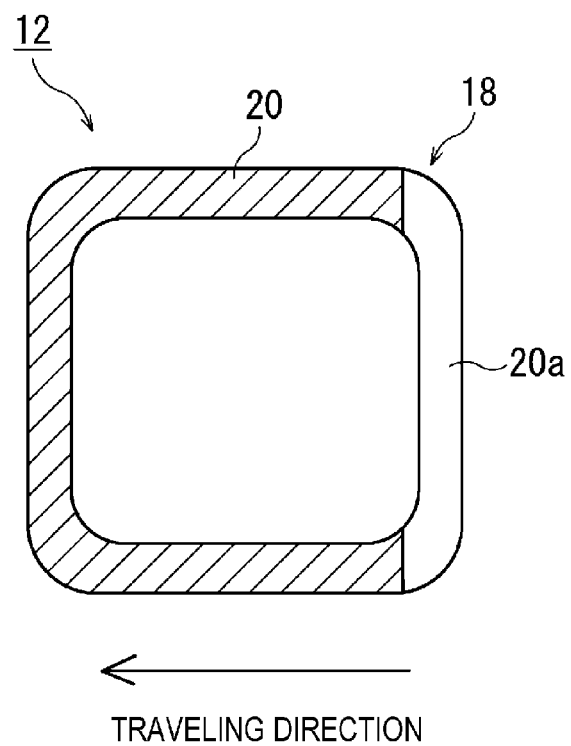
FIG. 6 is a view illustrating an example of a light emitting state of an automatic driving marker lamp.

FIG. 6 illustrates an example of a light emitting state of the automatic driving marker lamp 18. For example, when driving information indicating that the vehicle is traveling in the left direction is acquired from the automatic driving controller 42, as illustrated in FIG. 6, the controller 40 turns off the right side portion 20a of the rectangular light emitting area 20, and turns on the other portion 20b. By performing such display, the traveling direction of the vehicle may be presented to the pedestrians or the like around the vehicle.

Figure 7:
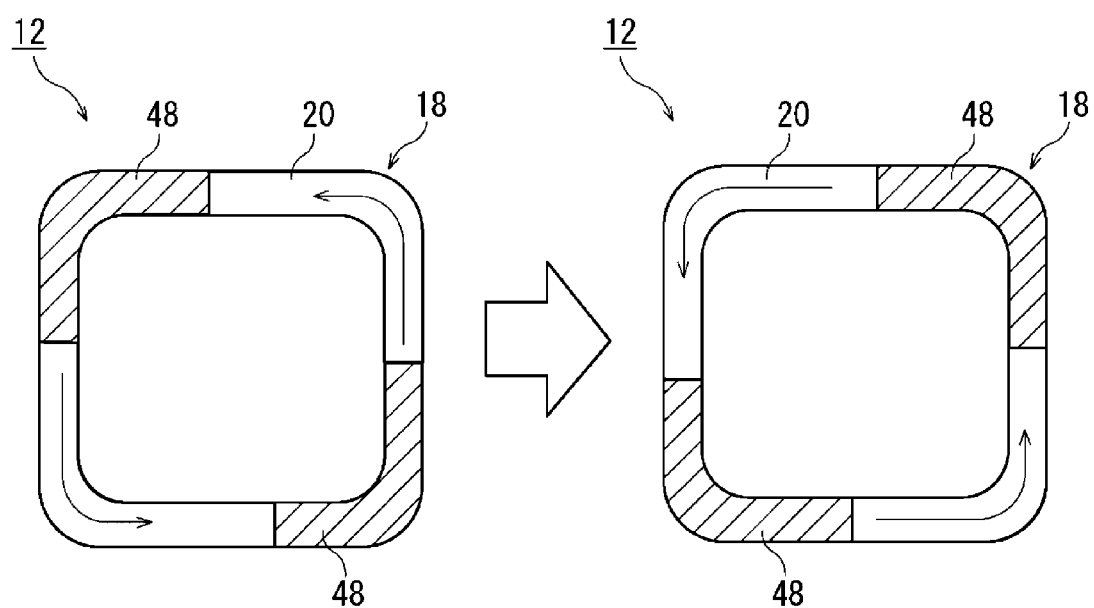
FIG. 7 is a view illustrating another example of a light emitting state of the automatic driving marker lamp.

FIG. 7 illustrates another example of a light emitting state of the automatic driving marker lamp 18. In this example, the automatic driving marker lamp 18 indicates the rotation of the tires of the vehicle. For example, when driving information indicating that the vehicle is traveling in the left direction is acquired from the automatic driving controller 42, as illustrated in FIG. 7, the controller 40 turns on a portion of the light emitting area 20, and moves the turned ON portion in an anti-clockwise rotation. By performing such display, the traveling direction of the vehicle may be presented to the pedestrians or the like around the vehicle.

As described above, according to the marker lamp system 12 according to the present embodiment, it is possible to indicate during automatic driving, and to perform various communications with an occupant or a person around the vehicle. Therefore, the improvement of the occupant's satisfaction or the improvement of safety may be promoted.

For example, in the embodiment described above, although a camera is illustrated as a sensor device which detects information around a vehicle, information around a vehicle may be detected using other methods. For example, voice recognition may be performed using a microphone, or authentication of an occupant may be performed using a non-contact IC card, or the like.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A marker lamp system provided on a vehicle, comprising:
   a sensor configured to detect information around the vehicle;
   a projector configured to project an image onto a road surface around the vehicle;
   a marker lamp having a light emitting area surrounding the sensor and the projector; and
   a controller configured to control the sensor, the projector and the marker lamp,
   wherein the controller controls the projector to project the image that includes both identification information of a person around the vehicle and driving information including a traveling direction of the vehicle onto the road surface based on the information around the vehicle detected by the sensor.

2. The marker lamp system according to claim 1, wherein the sensor includes a camera, and
   the controller performs image recognition of the person around the vehicle from an image captured by the camera in order to obtain the identification information of the person around the vehicle, and controls the projector based on the identification information of the person around the vehicle.

3. The marker lamp system according to claim 1, wherein the controller turns ON a portion of the light emitting area of the marker lamp and turns OFF a remaining portion of the light emitting area of the marker lamp based on the driving information of the vehicle.

4. The marker lamp system according to claim 3, wherein the controller rotates the turned-on portion of the light emitting area of the marker lamp in a clockwise direction or an anti-clockwise direction based on the driving information of the vehicle indicating that the vehicle is traveling in a front direction or a rear direction.

5. The marker lamp system according to claim 1, wherein the image is projected onto the road surface by the controller using an indicator that indicates the traveling direction of the vehicle including a turn direction of the vehicle.

6. A marker lamp system provided on a vehicle, the marker lamp system comprising:
   a lamp body;
   a camera accommodated in the lamp body and configured to detect information around the vehicle;
   a projector accommodated in the lamp body and configured to project an image onto a road surface around the vehicle;
   a marker lamp disposed on an outer peripheral portion of the lamp body and having a light emitting area surrounding the camera and the projector; and
   a controller configured to control the camera, the projector and the marker lamp,
   wherein the controller controls the projector to project the image onto the road surface based on the information around the vehicle detected by the camera.

7. The marker lamp system according to claim 6, wherein the camera is accommodated in a substantially central portion in the lamp body, and the projector is accommodated in a lower portion of the lamp body.

8. The marker lamp system according to claim 6, wherein the marker lamp includes:
   a substrate;
   a plurality of light emitting diodes (LEDs) disposed on the substrate and configured to emit light in a turquoise color; and
   a transparent outer lens disposed in front of the LEDs.

9. The marker lamp system according to claim 8, wherein the transparent outer lens is formed to be curved over an end portion of the lamp body so that the light is irradiated in a front direction and a rear direction of the vehicle.

10. The marker lamp system according to claim 8, the controller controls a light emitting and a non-light emitting of each of the plurality of LEDs so that a portion of the light emitting area of the marker lamp is turned ON and a remaining portion of the light emitting area of the marker lamp is turned OFF.

* * * * *